2,891,050

PROCESS OF TREATING SEEDS CONTAINING GALACTOMANNAN POLYSACCHARIDES

Gerard W. Elverum, Lakewood, Calif., and Paul E. Ramstad, Minneapolis, Minn., assignors to General Mills, Inc., a corporation of Delaware No Drawing. Application February 13, 1956
Serial No. 564,895

8 Claims. (Cl. 260—209)

The present invention relates to a process of treating seeds containing galactomannan polysaccharides, and more particularly relates to a process of producing finely divided mucilaginous material capable of producing high viscosities in aqueous sols.

Certain seeds from the plant family "Leguminosae," such as the locust bean, the honey locust bean, palo verde, flame tree, tara and guar contain neutral polysaccharides of large molecular weight with numerous short branches. The polysaccharide gums derived from these seeds are important as hydrophilic colloids which swell greatly in water to produce solutions or dispersions of high viscosity. Especially valuable at the present time are the gums derived from locust bean and guar seeds. Upon hydrolysis the two sugars D-galactose and D-mannose are obtained. Thus, the gums are commonly referred to as galactomannans.

The above seeds are composed of a pair of tough, non-brittle endosperm sections, hereafter referred to as "splits," between which is sandwiched a brittle embryo layer. The entire structure is enclosed in a tough seed coat. In general, all seeds of this type possess the above characteristic structure which presents many problems in their milling and treatments that are unique to this type of seed. Individual species are found to have variations in size and shape as well as in the thickness and toughness of the seed coat, relative amounts of endosperm and embryo, etc. In general, they are all susceptible to treatment according to the present invention.

Physically the endosperm "splits" are extremely tough and are not at all brittle. This renders them difficult to reduce to a finely divided condition. The "splits" are almost entirely composed of plant gum mucilage which is essentially a carbohydrate i.e., galactomannan polysaccharide. These plant mucilages are rather slowly dispersible in water and accordingly it is desirable to have them in as finely divided form as possible. Besides being extremely tough and difficult to grind, these mucilaginous seed endosperms when reduced to a finely divided condition by the slow and tedious methods heretofore available for that purpose, have been found to be decidedly impaired in their capacity to produce viscous aqueous sols. While, therefore, the finely divided condition is desirable for speed of dispersion, the use of this material in this form has not been desirable for the above reasons. Where the galactomannan mucilaginous material is prepared in a coarse or granular form, the time for dispersion is materially increased and in addition, it is frequently found that some particles have not been dispersed but exist in the product in a swollen condition. These swollen particles frequently present difficulties in the use of such aqueous dispersion. It is desirable, therefore, to have a material of this type in a finely divided condition and with its viscosity producing properties unimpaired. Such a product was not heretofore available.

Broadly our invention involves the discovery that the tough endosperm of these galactomannan leguminous seeds can be reduced to a finely divided form with great facility and without adverse effect on its properties. The invention comprises the step of passing the endosperm in a wet and softened condition between a set of rolls to reduce it to a flaked condition. The flaked endosperm may then be dried and ground to a fine condition without difficulty to produce a material which is readily dispersible in water to yield sols of high viscosity. The flattening or flaking step has some peculiar effect on the endosperm which makes its reduction to a finely divided condition simple and at the same time the viscosity-producing properties are not adversely affected as is the case when the endosperm in its natural state is ground by whatever slow and tedious methods are available. The flaking of the endosperm may be considered as a total or partial substitute for subsequent grinding.

It is, therefore, an object of the present invention to provide a method of producing mucilage in this seed material in a finely divided condition without impairing the desirable properties of that material.

It is a further object of the present invention to provide a method of reducing mucilage in this endosperm to a finely divided condition.

Another object of the invention is to provide a novel finely divided endosperm product with improved properties as compared with finely divided endosperm products heretofore available.

These and other objects of the invention will be apparent to those skilled in the art from the following description which is to be understood as illustrative only, and not as limiting the invention. While the following detailed description may relate specifically to certain of the galactomannan mucilaginous seeds heretofore mentioned, it is to be understood that the invention is also applicable to the other seeds of this type.

As has been mentioned previously the most important step of the process is the flattening or flaking of the endosperm in a wet and softened condition. It will be apparent that this step may be carried out on endosperm in an isolated condition or may be carried out on an endosperm having seed coat attached, depending on the purity of the product desired and the use to which it is to be put. Seed coat particles may be reduced to a finely divided condition in the subsequent grinding operation and may become substantially invisible to the eye in the finely ground product or in aqueous sols made therefrom. All these products of varying degrees of purity possess improved properties when compared with a product of the same purity in the same state of subdivision but produced by other processes.

When the process is carried out on isolated endosperm, any suitable method of isolating the endosperm may be employed. For example, the seeds may be passed through a hammer mill, bran finisher, impactor, or other device which will subject them to impact such that they are broken into two endosperm sections to each of which a layer of seed coat is attached. The brittle embryo material is broken into particles much smaller than the endosperm sections and can be separated by screening. The seed coat may be removed from the endosperm sections by soaking the material in an aqueous solution, preferably alkaline, after which the endosperm sections may be agitated or rubbed in order to loosen the seed coat sufficiently so that it may be washed off. For example, treatment with a 5% caustic soda solution at the boiling point for a period of from five to ten minutes was found satisfactory. The loosened seed coats may be separated from the endosperm sections by flotation or screening.

It is to be understood that any other method of removing the said coat from the endosperm may be employed in place of the above described aqueous method. For example, some of the varieties of seeds mentioned herein, notably guar, may be freed from the said coat by flame-peeling operation. Likewise, by a straight milling operation, it is possible to get particles of endosperm relatively free from said coat and these endosperm particles may be flaked and reduced to a finely divided condition, in accordance with the present disclosure.

The endosperm in suitably moistened condition is run through a pair of closely set rolls, whereby the endosperm is flaked and the natural cellular structure of the material is disrupted. Microscopic examination indicates that many of the individual cells are broken which may account in part for the ease of dispersion of the resultant material. In any event, it is found that when such flaked endosperm is ground or dried and ground, it has far superior viscosity-producing properties than does the same material reduced to finely divided condition by other means.

The flaking operation is carried out after the endosperm portion or sections have been tempered to the desired moisture content. The tempering operation may be carried out in several ways. One suitable method is to spray the endosperm with fine particles of water as it moves along a conveyor belt. Several factors must be taken into consideration in order to determine the particular moisture content to be employed. For example, if too much moisture is present, the material has a tendency to ride the rolls and friction will not be great enough to force the material between the rolls. Similarly, it is possible to reduce the moisture content to such an extent that the material will fracture and produce a granular product instead of flaking. In addition, the moisture content may vary both with the type of seed, its particle size, and physical characteristics of the flaking roll. For instance, guar endosperm has a greater tendency to gum up or ball up and should be flaked at a lower moisture content than that of honey locust bean, which has less of a tendency to ball or gum up on the rolls. Similarly, if a complete endosperm section is fed to the rolls, and it is desired to reduce it to a flake of a given thickness, it will be appreciated that such complete endosperm section should have a higher moisture content than would be necessary in a particle of a smaller size. The larger the particle size the further the material must flow during the flaking operation and, accordingly, the greater the moisture content necessary for such flow. With all these factors in mind, it has been determined that the moisture content of the endosperm sections should be in the range of 30 to 60% water, the preferred range being 35 to 55%.

The particle size will also depend upon the pressure applied by the rolls. Thus, by varying the pressure and moisture content the character of the flakes will differ greatly.

The flaking operation in addition to giving the beneficial results outlined above may be considered as total or partial substitute for grinding the endosperm. This is graphically illustrated by the fact that guar "splits" tempered for 20 minutes at 45% moisture and flaked four times gave a product almost as good as those prepared by grinding the same material.

The physical characteristics of the flaking rolls also are factors affecting the optimum moisture content. Thus, the diameter of the rolls, the nature of the roll surface, the coefficient of friction between the roll surface and the particle (which coefficient of friction varies with moisture content), the presence or absence of differential speeds between the rolls and other factors commonly encountered in such operations, all contribute to the characteristics of the operation. Those skilled in the art of milling appreciate the various factors involved in the operation, and can readily determine for any particular operation what operating conditions are necessary or desirable in order to effect the type of flaking operation desired.

The flattened endosperm may be dispersed directly in water in certain applications and produces desirable sols. It is usually preferred, however, to dry the flattened endosperm and reduce to a finely divided condition in which form it is more readily dispersible and requires less agitation.

The following examples will illustrate some of the advantages of the present process.

EXAMPLE 1

Guar endosperm particles were ground to a point at which they would pass the 13XX silk bolting cloth. A sol was prepared by adding one part by weight of dry powder to 199 parts by weight of water, heating to 80° C., for 10 minutes and cooling to 25° C. The resulting sol had a viscosity measured in a MacMichael viscosimeter at 20 r.p.m. of 50 centipoises. Guar endosperm of the same lot was tempered to a moisture content of about 40% and the material fed through closely set steel rolls which flattened the endosperm particles into thin flakes. After drying to the original moisture content of the endosperm, these flakes were ground in the same pulverizer until they would pass a 13XX silk bolting cloth. A sol made from this finely divided material of the same concentration as the previously mentioned sol and made up and tested under the same conditions was found to have a viscosity of 500 centipoises.

EXAMPLE 2

A comparison was made between various types of mucilaginous seeds, each processed as in the foregoing example with the following results:

| Mucilaginous Seed | Viscosity Unflaked Material, centipoises | Viscosity Flaked Material, centipoises |
| --- | --- | --- |
| Guar | 50 | 500 |
| Tara | 108 | 412 |
| Locust Bean | 83 | 155 |

EXAMPLE 3

Another desirable characteristic of the products of this invention is their rapid hydration in cold water to form viscous aqueous sols. Table I shows the results obtained by flaking seven 300 gm. portions of guar "splits" which had been tempered at the various moisture levels. The flaked materials were then dried and ground.

Table I

| Sample No. | Splits, percent moist | Drying time | 15 min. cold water viscosity [1] in centipoises |
| --- | --- | --- | --- |
| 1 | 15.8 | 15 min. | 1,025 |
| 2 | 25 | 20 | 1,860 |
| 3 | 35 | 20 | 2,140 |
| 4 | 45 | 20 | 2,400 |
| 5 | 55 | 45 | 2,200 |
| 6 | 65 | 45 | 1,860 |
| 7 | 75 | 1 hr. | 1,050 |

[1] 500 cc. of water at 25° C. was stirred in a high-speed blendor in such a manner that the vortex extended to about half the depth of the water. 5 gm. samples (dry weight) were added to the water and the stirring continued for 2 minutes after which time the sol was permitted to stand for 13 minutes. A Brookfield viscometer with a No. 3 spindle was immersed in the sol during the waiting period. At the end of the 13 minutes the viscometer was turned on at 20 r.p.m. and permitted to make 5 revolutions at which time the reading was taken.

The dried samples were ground twice in an air classifier having a 30 inch diameter and containing 2 banks of whizzer blades, each bank accommodating 24 blades.

EXAMPLE 4

A sample of guar "splits" were ground in a conventional manner and analyzed for particle size. The percentage breakdown is shown in Table II.

Table II

| Screen Size | Sieve opening (millimeters) | Wt. percent of total |
| --- | --- | --- |
| +100 | 0.149 | 1.5 |
| −100, +140 | 0.105 | 26.1 |
| −140, +200 | 0.074 | 9.7 |
| −200, +270 | 0.053 | 34.4 |
| −270, +325 | 0.044 | 4.1 |
| −325 |  | 24.1 |

This same sample was ground in a ball mill in successive runs until the entire sample passed through the 325 mesh screen.

Viscosity tests were made on the crude ground and pulverized guar "splits" thus obtained. The results of these tests showed that there was no significant difference in the viscosity of the sols produced in this manner. This was interpreted as showing that the viscosity of the sols is not entirely dependent on the particle size to which the endosperm is ground. Likewise, the samples shown in this example were inferior to those of Example 3 in all respects tested.

EXAMPLE 5

Guar "splits" tempered at 47.8% moisture and flaked, produced a product having the appearance of art gum eraser shavings. After two passes through the air classifier described in Example 3, the resulting guar flour had the following characteristics: 15.8% moisture, 75% passed through a 200 mesh screen, and the viscosity of this −200 mesh material was 3350 centipoises as calculated by the method of Example 3.

EXAMPLE 6

Guar flour was prepared in the same manner as Example 5 except that the flakes from the 47.8% tempered "splits" were dried after the flaking step in an oven to a moisture content of 14%. The resulting crisp flakes after 2 passes through air classifier produced a flour of 4.5% moisture and 86% passed through a 200 mesh screen. The viscosity of the −200 mesh material being 3150 centipoises determined by the method of Example 3.

The galactomannan gums prepared in accordance with the teachings of this invention have a wide field of application. Due to their strong hydrophilic character they are excellent additives in the manufacture of paper. In admixture with starch they are valuable textile sizes. They are excellent thickeners for textile printing pastes. There are various other applications such as their use in salad dressing, ice cream, bakery products and other foodstuffs or their use in drilling muds. These are only a few examples of their diversified utility.

While various embodiments of the invention have been described it is to be understood that the same is not limited thereto, but may be varied within the scope of the appended claims.

Now, therefore, we claim:

1. Process for the production of mucilaginous material from leguminous seeds, the endosperm sections of which are composed largely of galactomannans which comprises tempering said endosperm sections until they have a moisture content in the range of 30 to 60% by weight of water and flattening said endosperm while in this wet and softened condition by passing it between rolls.

2. A process according to claim 1 which comprises drying and grinding the flattened endosperm.

3. A process according to claim 1 which comprises flame peeling to remove the attached seed coat prior to flattening the endosperm.

4. A process according to claim 1 which comprises soaking said endosperm having attached seed coat in an aqueous medium to remove the seed coat.

5. Process for the production of mucilaginous material from leguminous seeds, the endosperm sections of which are composed largely of galactomannans which comprises separating the endosperm from the remainder of the seed, tempering said endosperm sections until they have a moisture content in the range of 30 to 60% by weight of water and flattening said endosperm while in this wet and softened condition by passing it between rolls.

6. Process for the production of mucilaginous material from leguminous seeds, the endosperm sections of which are composed largely of galactomannans which comprises flame peeling the attached seed coat, splitting the remainder into a pair of endosperm sections and broken embryo material, separating said endosperm sections, tempering said endosperm sections until they have a moisture content in the range of 30 to 60% by weight of water and flattening said endosperm while in this wet and softened condition by passing it between rolls.

7. Process for the production of mucilaginous material from leguminous seeds, the endosperm sections of which are composed largely of galactomannans which comprises splitting the seeds into a pair of endosperm sections having seed coat attached thereto and broken embryo material, separating said endosperm sections, soaking said endosperm sections in an aqueous media to remove the seed coat, tempering said endosperm sections until they have a moisture content in the range of 30 to 60% by weight of water and flattening said endosperm while in this wet and softened condition by passing it between rolls.

8. Process for the production of mucilaginous material from guar seeds the endosperm of which is composed largely of galactomannans which comprises tempering the endosperm sections from such guar seeds to a moisture content in the range of 35 to 55% by weight of water, flattening the endosperm by passing it between rolls while in this wet and softened condition, drying and grinding the flattened endosperm.

References Cited in the file of this patent

UNITED STATES PATENTS

| | | |
| --- | --- | --- |
| 924,319 | Castle | June 8, 1909 |
| 1,972,666 | Pays | Sept. 4, 1934 |
| 2,523,635 | Ramstad et al. | Sept. 26, 1950 |
| 2,662,882 | Christianson et al. | Dec. 15, 1953 |

OTHER REFERENCES

"Journal of Society Dyers and Colourists," vol. 45, December 1929, pp. 344–349.